(12) United States Patent
Petty et al.

(10) Patent No.: US 8,356,483 B2
(45) Date of Patent: Jan. 22, 2013

(54) GAS TURBINE ENGINE SYSTEMS INVOLVING VARIABLE NOZZLES WITH SLIDING DOORS

(75) Inventors: Dale William Petty, Wallingford, CT (US); Shawn M. McMahon, Manchester, CT (US); Michael Joseph Murphy, Vernon, CT (US); Sean P. Zamora, Coventry, CT (US); Timothy A. Swanson, Coventry, CT (US)

(73) Assignee: United Technologies Corp, Hartford, CT (US)

( * ) Notice: Subject to any disclaimer, the term of this patent is extended or adjusted under 35 U.S.C. 154(b) by 952 days.

(21) Appl. No.: 12/100,470

(22) Filed: Apr. 10, 2008

(65) Prior Publication Data

US 2009/0255269 A1 Oct. 15, 2009

(51) Int. Cl.
F02K 1/06 (2006.01)
(52) U.S. Cl. ............... 60/770; 60/771; 60/231; 60/232; 60/226.1; 60/226.3; 239/265.17; 239/265.19; 239/265.35
(58) Field of Classification Search .................. 60/771, 60/770, 232, 226.1, 226.3, 231; 239/265.19, 239/265.35, 265.17
See application file for complete search history.

(56) References Cited

U.S. PATENT DOCUMENTS

| | | | |
|---|---|---|---|
| 2,737,015 A | 3/1956 | Wright | |
| 3,386,658 A * | 6/1968 | Mehr | 239/127.3 |
| 3,449,914 A * | 6/1969 | Brown | 405/215 |
| 3,841,091 A | 10/1974 | Sargisson | |
| 4,068,469 A * | 1/1978 | Adamson | 60/204 |
| 4,175,384 A * | 11/1979 | Wagenknecht et al. | 60/226.3 |
| 5,307,624 A * | 5/1994 | Even-Nur et al. | 60/226.3 |
| 5,694,767 A * | 12/1997 | Vdoviak et al. | 60/226.3 |
| 5,778,659 A | 7/1998 | Duesler et al. | |
| 5,833,140 A | 11/1998 | Loffredo et al. | |
| 5,893,518 A | 4/1999 | Bruchez, Jr. et al. | |
| 6,901,739 B2 * | 6/2005 | Christopherson | 60/226.3 |
| 6,938,408 B2 | 9/2005 | Lair | |
| 7,004,047 B2 | 2/2006 | Rey et al. | |
| 7,093,793 B2 | 8/2006 | Lair | |
| 7,134,271 B2 | 11/2006 | Baughman et al. | |
| 7,174,704 B2 | 2/2007 | Renggli | |
| 7,178,338 B2 | 2/2007 | Whurr | |
| 7,216,476 B2 | 5/2007 | Fink | |
| 7,770,381 B2 * | 8/2010 | Johnson et al. | 60/263 |
| 2006/0064960 A1 * | 3/2006 | Johnson | 60/226.3 |
| 2007/0018034 A1 | 1/2007 | Dickau | |

FOREIGN PATENT DOCUMENTS

| | | |
|---|---|---|
| CA | 1029201 | 4/1978 |
| DE | 1081277 | 5/1960 |
| EP | 1619376 | 1/2006 |
| FR | 2184021 | 12/1973 |
| FR | 2499158 | 8/1982 |
| GB | 862405 | 3/1961 |

OTHER PUBLICATIONS

European Search Report, dated Aug. 12, 2009, EP Application No. 09250923.1-2315.
Anders Hasselrot, Bjorn Montgomerie, "An Overview of Propulsion Systems for Flying Vehicles," FOI Swedish Defence Research Agency, Jun. 2005.

* cited by examiner

*Primary Examiner* — William H Rodriguez
*Assistant Examiner* — Steven Sutherland
(74) *Attorney, Agent, or Firm* — Carlson, Gaskey & Olds

(57) ABSTRACT

A nozzle assembly for a gas turbine engine includes a door axially slidable relative to a passage in communication with a secondary flow path to regulate the secondary flow though the passage.

26 Claims, 4 Drawing Sheets

US 8,356,483 B2

GAS TURBINE ENGINE SYSTEMS INVOLVING VARIABLE NOZZLES WITH SLIDING DOORS

BACKGROUND

1. Technical Field

The disclosure generally relates to gas turbine engines.

2. Description of the Related Art

Variable cycle engines power high performance aircraft over a range of operating conditions yet achieve countervailing objectives such as high specific thrust and low fuel consumption. A variable cycle engine essential alters the engine bypass ratio during flight to facilitate efficient performance over a broad range of altitude and flight velocity such as to generate high thrust for maneuver and optimized fuel efficiency for loiter.

Variable cycle engines typically include a variable exhaust nozzle system which operates over a wide range of pressure ratios by adjustment of a nozzle throat based on the demands of the engine cycle, and may include provision for adjustment of a nozzle area ratio to facilitate desired engine performance at various operating points.

The variable cycle engine and exhaust described herein comprises of three flow streams, exhausting through two nozzles. The low pressure compressor stream and core stream exhaust through the primary nozzle. The fan stream exits the variable secondary nozzle. Varying the secondary nozzle alters thrust at the nozzle exit. Also varying the secondary nozzle exit area affects the overall engine cycle by directing of flow into or diverting away from the primary flowpath by varying third stream back pressure, thus effectively altering the bypass ratio.

SUMMARY

A nozzle assembly for a gas turbine engine according to an exemplary aspect of the present disclosure includes a door adjacent a secondary flow path for a secondary flow and a primary flow path for a primary flow, the door axially slidable relative to a passage in communication with the secondary flow path to regulate the secondary flow though said passage.

A gas turbine engine according to an exemplary aspect of the present disclosure includes an engine duct structure and an inner structure which at least partially define a secondary flow path for a secondary flow and a primary flow path for a primary flow, the secondary flow path defined at least partially around a perimeter of the primary flow path. A secondary flow duct with a generally planar secondary nozzle to communicate the secondary flow therethrough and a primary flow duct with a generally planar primary nozzle to communicate the primary flow therethrough, the generally planar primary nozzle adjacent to the generally planar secondary nozzle. A door axially slidable relative to a passage in communication with the secondary flow path to regulate the secondary flow though said passage.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Gas turbine engine systems involving variable nozzles with sliding doors are provided, several exemplary embodiments of which will be described in detail. In some embodiments, such a sliding door is moved fore and aft in a gas turbine engine to vary the nozzle exhaust area of the engine dynamically. Varying the nozzle exhaust area in a gas turbine engine can increase engine performance characteristics such as fuel efficiency.

Figure 1:
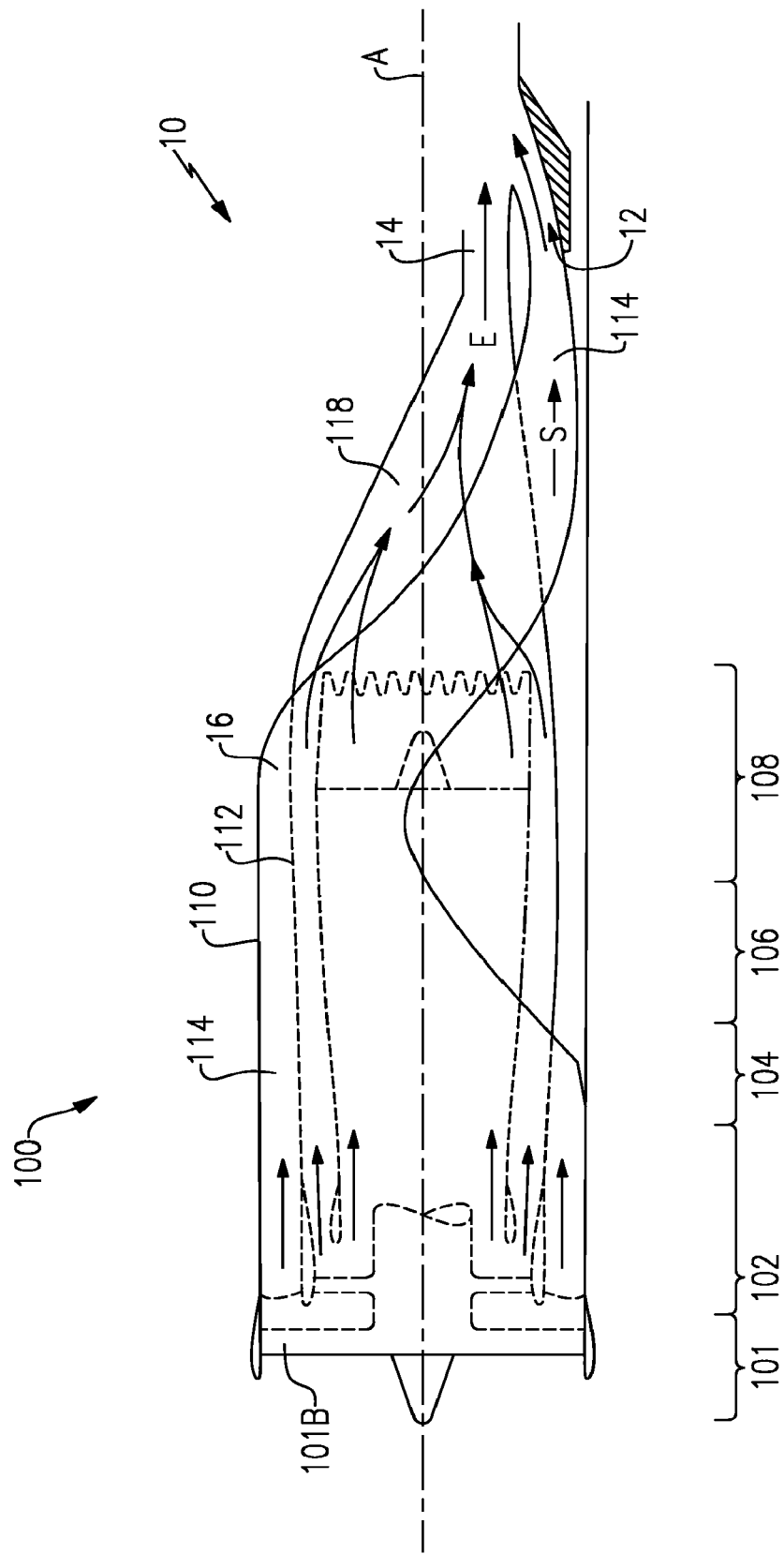
FIG. 1 is a schematic diagram depicting an exemplary embodiment of a gas turbine engine.

FIG. 1 is a schematic diagram depicting an exemplary embodiment of a gas turbine engine 100 in which a nozzle assembly 10 that incorporates a sliding door can be used to operatively vary the nozzle assembly 10 and affect engine performance.

Figure 2:
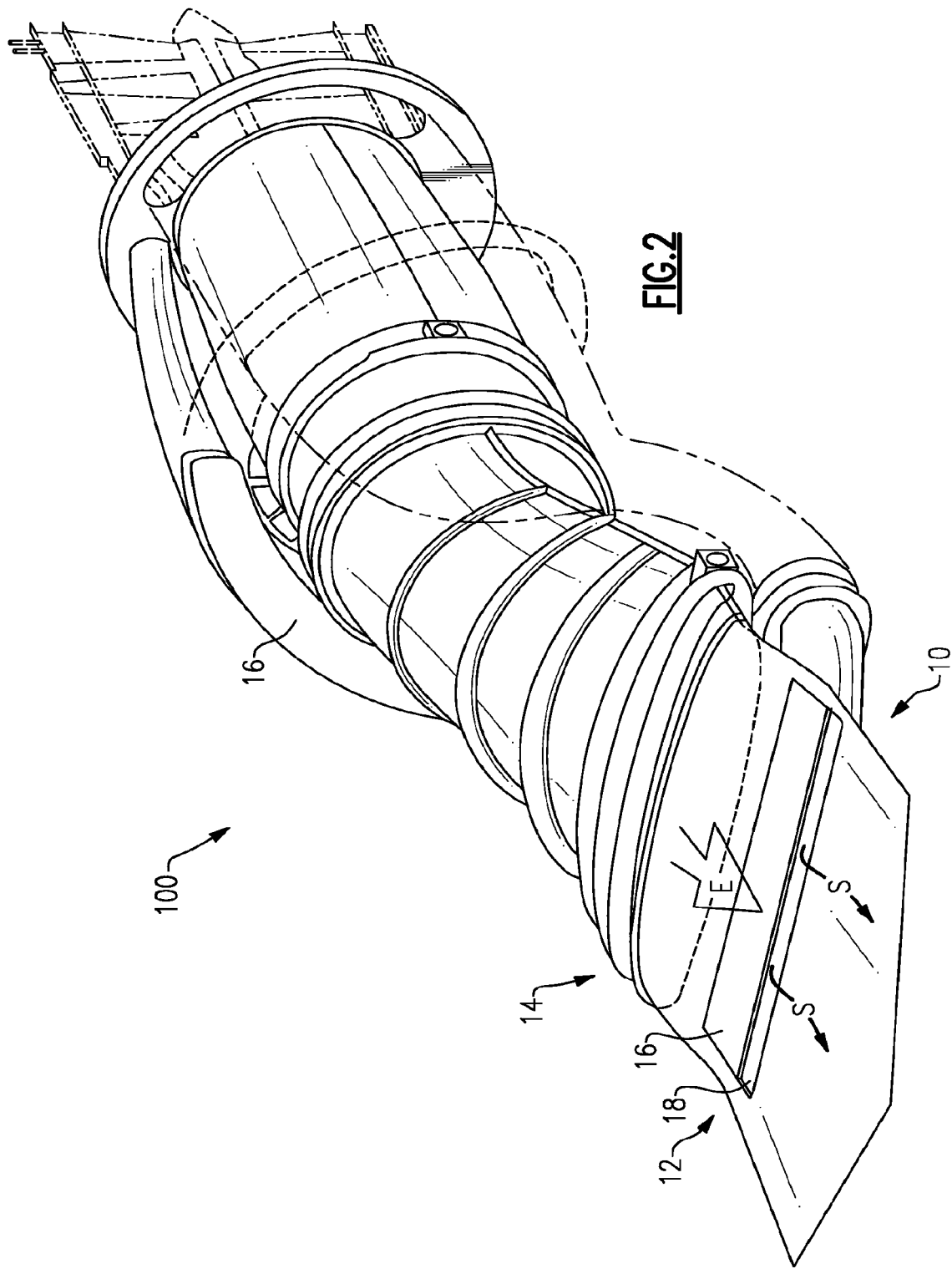
FIG. 2 is a cross-sectional perspective diagram of the gas turbine engine of FIG. 1.

As shown in both FIG. 1 and FIG. 2, the gas turbine engine 100 includes a fan section 101, a compressor section 102, a combustion section 104, a turbine section 106, and an exhaust section 108. The compressor section 102, combustion section 104 and turbine section 106 are generally referred to as the core engine. A central longitudinal axis of the engine A extends longitudinally through these sections. It should be noted that although engine 100 is a turbofan engine, there is no intention to limit the concepts to use with turbofan engines as other types of gas turbine engines can be used.

A secondary duct 110 and a primary duct 112 respectively define an at least partially annular secondary flow path 114 at least partially around a perimeter of a primary flow path 118 which directs a primary combustion core gas exhaust flow (illustrated schematically by arrow E). The secondary duct 110 in one non-limiting embodiment is a bifurcated duct arrangement which join at the generally planar secondary nozzle 12 (FIG. 2). The primary duct 112 is generally circular in cross-section at an upstream segment and transitions into the generally planar primary nozzle 14 at an aft end thereof. The secondary nozzle 12 and the primary nozzle 14 in the disclosed non-limiting embodiment include a straight shaped trailing edge, however, it should be understood that any other configuration may alternatively be utilized. It should be understood that the engine duct structure 110, 112 may also at least partially define various flow paths other than the disclosed secondary flow path 114.

Engine 100 includes a nozzle assembly 10, located at the aft end of the exhaust section 108, that defines the generally planar secondary nozzle 12 and the generally planar primary nozzle 14 adjacent thereto. The secondary flow path 114 guides a secondary flow S typically sourced from the fan section 101 and/or the compressor section 102. The secondary flow S is utilized for a multiple of purposes including, for example, cooling, pressurization, and mixing with the primary combustion core gas exhaust flow E prior to discharge through the nozzle assembly 10 during particular operational profiles.

The secondary flow S as defined herein is any flow different from the primary combustion core gas exhaust flow E such as a variable cycle third stream fan flow stream deployed. That is, the two dimensional secondary nozzle 12 may be a third stream exhaust nozzle which regulates a third flow stream selectively sourced from the fan section 101 and/or the compressor section 102. Notably, performance of engine 100 can be affected by regulating the secondary flow S by varying the two dimensional secondary nozzle 12.

Figure 3:
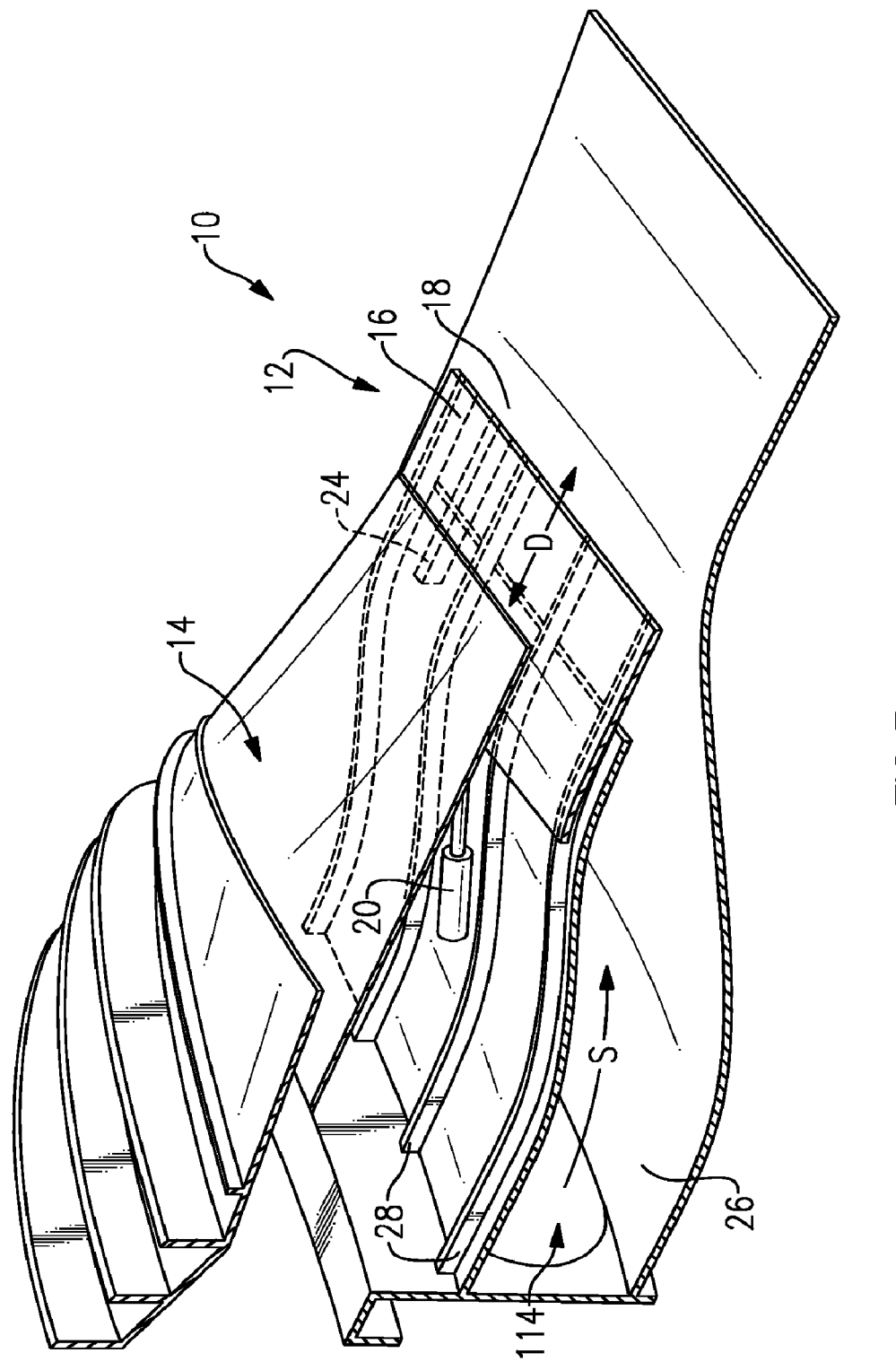
FIG. 3 is a perspective diagram depicting an exemplary embodiment of a nozzle assembly.

In this regard, reference is made to FIG. 3, which depicts nozzle assembly 10 and the incorporated sliding door 16. As shown in FIG. 3, sliding door 16 is configured to be translated across a passage 18 of the generally planar secondary nozzle 12 and thereby influence gas directed along secondary flow path 26.

In at least one embodiment, the nozzle assembly 10 is a third stream exhaust nozzle that is operative to regulate gas accelerated by a tertiary fan 101B (e.g., a tip fan located radially outboard of a fan stage; FIG. 1). A third stream nozzle facilitates a variable engine cycle. By way of example, by closing the third stream nozzle area, the third stream duct experiences increased backpressure and the fan air normally flowing into the third stream duct diverts into the secondary/primary flow stream. Notably, the flow streams communicate just aft of the fan section 101. A third stream splitter, which can be located several inches aft of the fan, for example, leaves a large enough area for effective flow stream communication. However, in other embodiments, a nozzle assembly can be used for varying the flow characteristics of gas directed along one or more other gas paths.

The sliding door 16 is configured to be variably positioned along a range of positions between a full open position, at which the generally planar secondary nozzle 12 exhibits a maximum exit area, and a full closed position, at which the generally planar secondary nozzle 12 exhibits a minimum exit area. As the sliding door 16 is variably positioned, gas directed along secondary flow path 26 is regulated.

In the embodiment of FIG. 3, the sliding door 16 exhibits a low section area relative to a direction of travel associated with gas directed along secondary flow path 26. Such a configuration and orientation tends to result in a low actuation load, i.e., the load required to be overcome for positioning of the sliding door 16. In this regard, the nozzle assembly 10 also incorporates an actuator 20 that engages sliding door 16. The actuator 20 is attached to the sliding door 16 and is configured to operatively translate the sliding door 16 in both a fore and aft direction, generally parallel to the engine axis A as indicated by arrow D. The actuator 20 can be an air motor driven direct actuated ball screw ram, direct actuated hydraulic ram, and air or hydraulic driven mechanisms. Actuator 20 may be singular or a plurality of synchronized actuators. For example, the actuator 20 includes air motor driven direct actuated ball screw rams (such as linear motion cylindrical actuators or rotary motion actuators), synchronized via flex drive cables (a commonly used actuation configuration in various commercial nacelle reverser cowlings). The actuator 20 can be located unobtrusively in an area 22 of the nozzle assembly 10 between the secondary duct 110 and the primary duct 112.

In some embodiments, the nozzle assembly 10 may incorporate a pressurized plenum. Such a pressurized plenum can be configured to provide pressure balancing to the nozzle assembly thereby reducing actuation loads. If the loads are predicted to be reacted primarily by the tracks, a plenum may not be required. However, when a plenum is utilized (such as in association with area 22 in this embodiment), the plenum can be a direct acting plenum placed, for example, on the forward face of the sliding door 16. Alternatively, a remote balance chamber can be utilized.

The nozzle assembly 10 also incorporates a rail 24 for the sliding door 16. The rail 24 facilitates the translation of the sliding door 16. In particular, the rail 24 provides a track on which the sliding door 16 is translated. The rail 24 also is configured to provide alignment and structural stability to the sliding door 16. In at least one embodiment, more than one rail 24 may be utilized. In other embodiments, the rail 24 includes one or more bearings to facilitate a smoother translation of the sliding door 16 along the rail 24. In yet another embodiment, the tracks of the rail 24 can be embedded in the fixed structure ahead of the sliding door 16, and/or along sides of the sliding door 16, such that sliding door 16 is cantilevered aft and the tracks are hidden from the flowpath.

The nozzle assembly 10 also incorporates a plurality of stiffening ribs 28 to control deflection of the sliding door as the sliding door 16 is variably opened and closed. For example, as the sliding door 16 is variably closed, pressure increases within the secondary duct 110. The plurality of stiffening ribs 28, located behind the interior wall of the secondary duct 110, reduces deflection of area 22. The plurality of stiffening ribs 28 also provides structural support to the sliding door 16 as the door translates across the passage 18.

Figure 4:
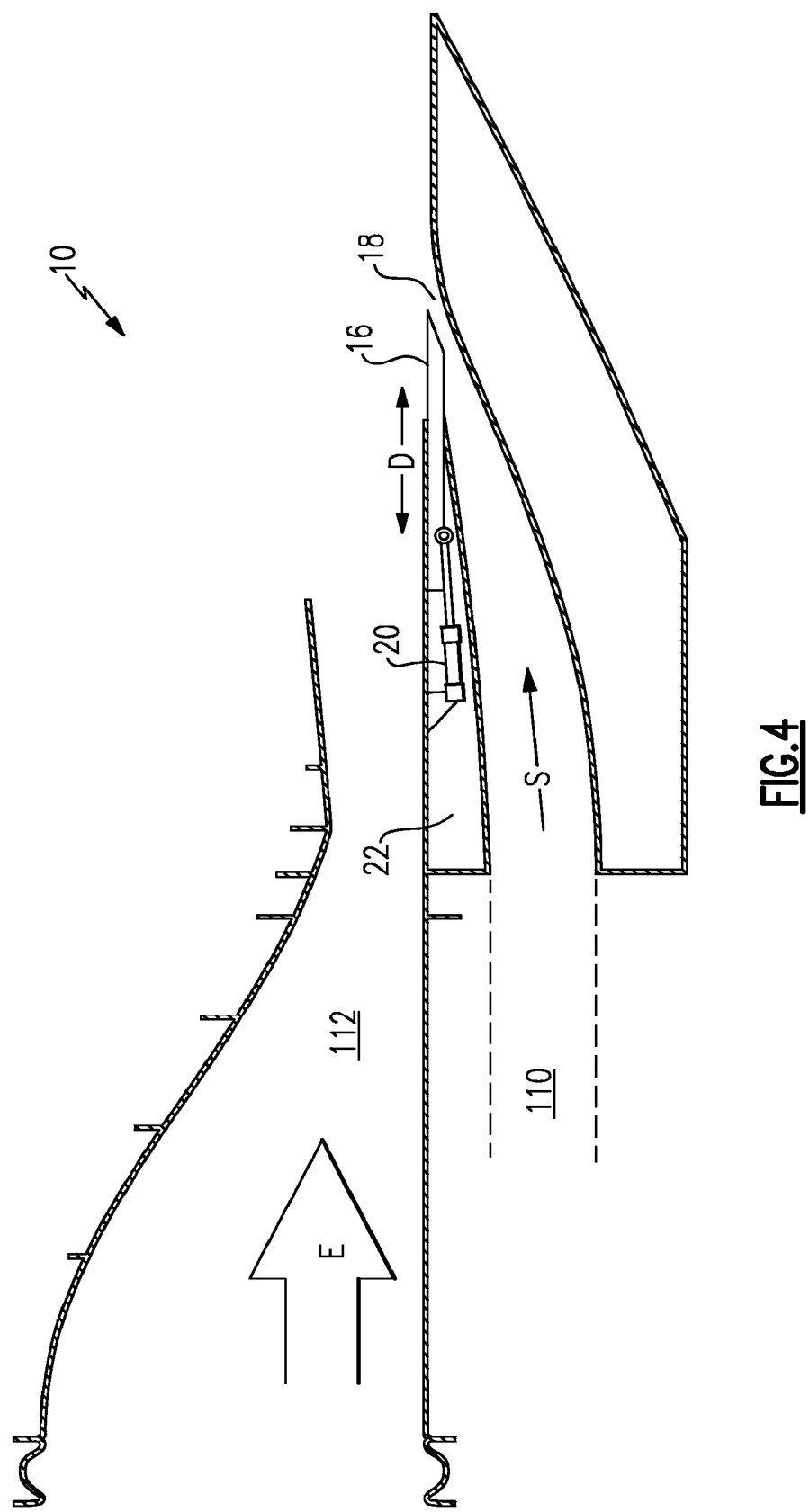
FIG. 4 is a schematic diagram depicting the sliding door of the embodiment of FIG. 3 in a planar view.

As shown in FIG. 4, the actuator 20 is connected to the sliding door 16 and is configured to operatively translate the sliding door 16 in both a fore and aft direction, as indicated by arrow D, thus varying the flow through the generally planar secondary nozzle 12 of the nozzle assembly 10. In operation, the sliding door 16 is variably opened and closed, by translating in both a fore and aft direction. In other embodiments, more complex motion of the sliding door can be used. Regardless of the particular motion involved, positioning of the sliding door 16 varies the nozzle assembly 10 and thereby affects one or more of various engine performance characteristics.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, in some embodiments, a sliding door can be configured to alter a nozzle throat asymmetrically in order to affect yaw vectoring of the flow. In some embodiments, this can be accomplished by the use of differential actuation of multiple actuators. All such modifications and variations are intended to be included herein within the scope of this disclosure and protected by the accompanying claims.

The invention claimed is:

1. A nozzle assembly for a gas turbine engine, the nozzle assembly comprising:
   a door operative to selectively increase and decrease an effective size of the nozzle exit area;
   a secondary flow duct with a two dimensional secondary nozzle to communicate a secondary flow therethrough;
   a primary flow duct with a two dimensional primary nozzle to communicate primary flow therethrough, said two dimensional primary nozzle adjacent to said two dimensional secondary nozzle;
   said door axially slidable relative to a passage adjacent a secondary flow path for said secondary flow and a primary flow path for said primary flow, said door axially slidable relative to a passage in communication with said secondary flow path; and an actuator entirely disposed in an area between said primary flow duct and said secondary flow duct, said actuator attached to said door and configured to slide said door.

2. The nozzle assembly of claim 1, further comprising:
said actuator connected to the door and operative to position the door such that the effective size of the nozzle exit area is established.

3. The nozzle assembly of claim 2, wherein the actuator is operative to translate the door in both fore and aft directions parallel to a longitudinal axis of the gas turbine engine.

4. The nozzle assembly of claim 2, wherein the nozzle is a third stream exhaust nozzle.

5. The nozzle assembly of claim 1, further comprising:
a rail engaging the door and operative to provide alignment of the door during positioning.

6. The nozzle assembly of claim 1, further comprising:
at least one stiffening rib contacting the door and operative to provide structural support to the door.

7. The nozzle assembly of claim 1, wherein said area is radially inward of said secondary flow duct and radially outward of said primary flow duct.

8. The nozzle assembly of claim 1, wherein said actuator is entirely disposed upstream of said door.

9. The nozzle assembly of claim 1, wherein said actuator is configured to pull the door upstream in a fore direction, and wherein said actuator is configured to push the door downstream in an aft direction.

10. A gas turbine engine comprising:
an engine duct structure and an inner structure which at least partially define a secondary flow path for a secondary flow and a primary flow path for a primary flow, said secondary flow path defined at least partially around a perimeter of said primary flow path;
a secondary flow duct with a two dimensional secondary nozzle to communicate said secondary flow therethrough;
a primary flow duct with a two dimensional primary nozzle to communicate said primary flow therethrough, said two dimensional primary nozzle adjacent to said two dimensional secondary nozzle; and
a door axially slidable relative to a passage in communication with said secondary flow path to regulate said secondary flow though said passage; and
an actuator entirely disposed in an area between said primary flow duct and said secondary flow duct, said actuator attached to said door and configured to slide said door.

11. The gas turbine engine of claim 10, further comprising said actuator connected to the door and operative to position the door.

12. The gas turbine engine of claim 11, wherein the actuator is operative to translate the door in both fore and aft directions.

13. The gas turbine engine of claim 10, wherein the nozzle assembly is a third stream exhaust nozzle assembly.

14. The gas turbine engine of claim 10, further comprising at least one stiffening rib operative to provide structural support to the door.

15. The gas turbine engine of claim 14, wherein the at least one stiffening rib is located on a non-gas path side of the door.

16. The gas turbine engine of claim 10, further comprising a rail operative to provide alignment of the door.

17. The gas turbine engine of claim 10, wherein the engine is a turbofan gas turbine engine.

18. The gas turbine engine of claim 10, wherein the door is operative to not affect the gas path with respect to yaw.

19. The gas turbine engine of claim 10, further comprising a plenum located on a non-gas path side of the door, the plenum being operative to pressurize in order to reduce an actuation load of the door.

20. The gas turbine engine of claim 10, wherein said primary flow includes at least a combustion core gas exhaust flow sourced from a turbine section of the gas turbine engine.

21. The gas turbine engine of claim 10, wherein said secondary flow is different than said combustion core gas exhaust flow.

22. The gas turbine engine of claim 10, wherein said two dimensional secondary nozzle is downstream of two dimensional primary nozzle.

23. The gas turbine engine of claim 10, wherein said two dimensional secondary nozzle is adjacent to said two dimensional primary nozzle.

24. The gas turbine engine of claim 10, wherein said area is radially inward of said secondary flow duct and radially outward of said primary flow duct.

25. The gas turbine engine of claim 10, wherein said actuator is entirely disposed upstream of said door.

26. The gas turbine engine of claim 10, wherein said actuator is configured to pull the door upstream in a fore direction, and wherein said actuator is configured to push the door downstream in an aft direction.

* * * * *